US012207098B2

(12) United States Patent
Ge et al.

(10) Patent No.: US 12,207,098 B2
(45) Date of Patent: Jan. 21, 2025

(54) SPECTRUM RESOURCE DETERMINING METHOD AND APPARATUS

(71) Applicant: HUAWEI TECHNOLOGIES CO., LTD., Shenzhen (CN)

(72) Inventors: Quan Ge, Shanghai (CN); Liwen Zhang, Shanghai (CN); Ning He, Shanghai (CN); Zhihua Liu, Shanghai (CN); Quanzhong Gao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 539 days.

(21) Appl. No.: 17/531,026

(22) Filed: Nov. 19, 2021

(65) Prior Publication Data

US 2022/0078629 A1 Mar. 10, 2022

Related U.S. Application Data

(63) Continuation of application No. PCT/CN2020/091665, filed on May 21, 2020.

(30) Foreign Application Priority Data

May 23, 2019 (CN) .......................... 201910436224.X

(51) Int. Cl.
H04W 16/14 (2009.01)
H04W 16/10 (2009.01)
(Continued)

(52) U.S. Cl.
CPC ........... *H04W 16/14* (2013.01); *H04W 16/10* (2013.01); *H04W 16/18* (2013.01); *H04W 72/541* (2023.01)

(58) Field of Classification Search
None
See application file for complete search history.

(56) References Cited

U.S. PATENT DOCUMENTS

2015/0281974 A1* 10/2015 Ghasemzadeh ... H04W 72/0453 455/454
2016/0219596 A1* 7/2016 Yanover ................ H04L 5/0073
(Continued)

FOREIGN PATENT DOCUMENTS

CN 109391397 A 2/2019
CN 110278563 A 9/2019
(Continued)

OTHER PUBLICATIONS

Extended European Search Report issued in corresponding European Application No. 20808808.8, dated Jun. 7, 2022, pp. 1-11.
(Continued)

Primary Examiner — Alpus Hsu
Assistant Examiner — Camquyen Thai
(74) Attorney, Agent, or Firm — HAUPTMAN HAM, LLP

(57) ABSTRACT

A spectrum resource determining method includes obtaining sharing information. The sharing information indicates that N first cells and one second cell share a first frequency band, a coverage area of each first cell among the N first cells overlaps a coverage area of the second cell, and N is an integer greater than 1. The method also includes determining a spectrum resource of each first cell among the N first cells in the first frequency band and a first spectrum resource of the second cell. The first spectrum resource is located in the first frequency band, and the first spectrum resource does not overlap the spectrum resource of each first cell among the N first cells in the first frequency band.

20 Claims, 8 Drawing Sheets

(51) Int. Cl.
 H04W 16/18 (2009.01)
 H04W 72/541 (2023.01)

(56) References Cited

U.S. PATENT DOCUMENTS

| | | | |
|---|---|---|---|
| 2017/0048722 A1* | 2/2017 | Van Phan | H04W 16/16 |
| 2018/0070369 A1* | 3/2018 | Papasakellariou | H04W 72/20 |
| 2018/0316472 A1 | 11/2018 | John Wilson et al. | |
| 2019/0261234 A1* | 8/2019 | Park | H04W 36/28 |
| 2020/0374826 A1* | 11/2020 | Zhang | H04L 5/0092 |

FOREIGN PATENT DOCUMENTS

| | | |
|---|---|---|
| WO | 2018086080 A1 | 5/2018 |
| WO | 2018127074 A1 | 7/2018 |

OTHER PUBLICATIONS

LG Electronics, On coexistence of NR and LTE. 3GPP TSG RAN WG1 meeting #86, Gothenburg, Sweden Aug. 22-26, 2016, R1-166924, 3 pages.

MediaTek Inc., On the clarification of in the same carrier. 3GPP TSG-RAN WG4 Meeting #87, Busan, Korea, May 21-25, 2018, R4-1806547, 3 pages.

International Search Report issued in corresponding International Application No. PCT/CN2020/091665, dated Aug. 19, 2020, pp. 1-10.

* cited by examiner

SPECTRUM RESOURCE DETERMINING METHOD AND APPARATUS

CROSS-REFERENCE TO RELATED APPLICATIONS

This application is a continuation of International Application No. PCT/CN2020/091665, filed on May 21, 2020, which claims priority to Chinese Patent Application No. 201910436224.X, filed on May 23, 2019. The disclosures of the aforementioned applications are hereby incorporated by reference in their entireties.

TECHNICAL FIELD

This application relates to the field of communication technologies, and in particular, to a spectrum resource determining method and apparatus.

BACKGROUND

As a quantity of terminals in a fifth generation (fifth generation, 5G) communication network increases, resource requirements of the 5G communication network also rapidly increase. This puts a strain on spectrum resources in the 5G communication network. Therefore, how to efficiently share spectrum resources becomes an urgent problem to be resolved.

SUMMARY

Embodiments of this application provide a spectrum resource determining method and apparatus, to increase utilization of spectrum resources.

To achieve the foregoing objective, the embodiments of this application provide the following technical solutions.

According to a first aspect, a spectrum resource determining method is provided. The method includes: obtaining sharing information indicating that N first cells and one second cell share a first frequency band; and determining a spectrum resource of each first cell among the N first cells in the first frequency band and a first spectrum resource of the second cell, where the first spectrum resource is located in the first frequency band, and the first spectrum resource does not overlap the spectrum resource of each first cell among the N first cells in the first frequency band; or determining a spectrum resource of an $n^{th}$ first cell among the N first cells in the first frequency band and an $n^{th}$ second spectrum resource of the second cell, where the $n^{th}$ second spectrum resource is located in the first frequency band, the $n^{th}$ second spectrum resource does not overlap the spectrum resource of the $n^{th}$ first cell in the first frequency band in an overlapping coverage area of the second cell and the $n^{th}$ first cell, and a value of n is an integer ranging from 1 to N. A coverage area of each first cell among the N first cells overlaps a coverage area of the second cell, and N is an integer greater than 1. The method according to the first aspect can implement spectrum sharing between a plurality of first cells and one second cell, to increase utilization of spectrum resources and a capacity of the second cell. In addition, there is no need to newly establish a plurality of second cells, which can avoid increasing cell deployment costs.

In a possible implementation, the method further includes: scheduling data of a terminal on the $n^{th}$ second spectrum resource when the terminal is located in a coverage area of the $n^{th}$ first cell and interference of the terminal to each of the other first cells among the N first cells is less than or equal to a first threshold, where a serving cell of the terminal is the second cell. This possible implementation can ensure that terminals transmitting data in different cells do not interfere with each other, thereby improving transmission performance.

In a possible implementation, the method further includes: scheduling data of a terminal on the first spectrum resource when the terminal is located in a coverage area of the $n^{th}$ first cell and interference of the terminal to any other first cell among the N first cells is greater than a first threshold, where a serving cell of the terminal is the second cell. This possible implementation can ensure that terminals transmitting data in different cells do not interfere with each other, thereby improving transmission performance.

In a possible implementation, the method further includes: obtaining spectrum resource requirement information, where the spectrum resource requirement information includes one or more of following information: spectrum resource requirement information of each first cell among the N first cells, spectrum resource requirement information of the second cell, and spectrum resource requirement information of the second cell in the overlapping coverage area of the second cell and the $n^{th}$ first cell; and the determining a spectrum resource of each first cell among the N first cells in the first frequency band and a first spectrum resource of the second cell includes: determining, based on the spectrum resource requirement information, the spectrum resource of each first cell among the N first cells in the first frequency band and the first spectrum resource of the second cell; or the determining a spectrum resource of an $n^{th}$ first cell among the N first cells in the first frequency band and an $n^{th}$ second spectrum resource of the second cell includes: determining, based on the spectrum resource requirement information, the spectrum resource of the $n^{th}$ first cell among the N first cells in the first frequency band and the $n^{th}$ second spectrum resource of the second cell. In this possible implementation, the first spectrum resource or a second spectrum resource can be determined based on the spectrum resource requirement information for more proper spectrum sharing.

In a possible implementation, the first frequency band is a frequency band used for uplink transmission or a frequency band used for downlink transmission. In this possible implementation, when the first frequency band is a frequency band used for uplink transmission, uplink spectrum resource sharing can be implemented, to improve utilization of uplink spectrum resources. When the first frequency band is a frequency band used for downlink transmission, downlink spectrum resource sharing can be implemented, to improve utilization of downlink spectrum resources.

In a possible implementation, the first frequency band is a frequency band used for uplink transmission, and a carrier including the first spectrum resource or the second spectrum resource in the second cell is used as an SUL of the second cell, or the carrier including the first spectrum resource or the second spectrum resource in the second cell is used to perform uplink CA with another carrier; or the first frequency band is a frequency band used for downlink transmission, and a carrier including the first spectrum resource or the second spectrum resource in the second cell is used to perform downlink CA with another carrier. In this possible implementation, if the carrier including the first spectrum resource or the second spectrum resource in the second cell is used as the SUL of the second cell, uplinks of the second cell can be supplemented, to improve uplink transmission efficiency. If the carrier including the first spectrum resource or the second spectrum resource in the second cell is used to perform uplink CA with another carrier, an uplink transmission bandwidth of the second cell can be increased, to improve uplink transmission efficiency. If the carrier including the first spectrum resource or the second spectrum resource in the second cell is used to perform downlink CA with another carrier, a downlink transmission bandwidth of the second cell can be increased, to improve downlink transmission efficiency.

In a possible implementation, network standards of the first cell and the second cell are different. This possible implementation can implement spectrum sharing between cells of different network standards, thereby improving utilization of spectrum resources.

In a possible implementation, the first cells are LTE cells, and the second cell is an NR cell. This possible implementation can implement spectrum sharing between a plurality of LTE cells and one NR cell, to increase utilization of spectrum resources and a capacity of the NR cell. In addition, there is no need to newly establish a plurality of NR cells, which can avoid increasing cell deployment costs.

According to a second aspect, a spectrum resource determining apparatus is provided, and includes: an obtaining unit, configured to obtain sharing information, where the sharing information indicates that N first cells and one second cell share a first frequency band, a coverage area of each first cell among the N first cells overlaps a coverage area of the second cell, and N is an integer greater than 1; and a first determining unit, configured to determine a spectrum resource of each first cell among the N first cells in the first frequency band and a first spectrum resource of the second cell, where the first spectrum resource is located in the first frequency band, and the first spectrum resource does not overlap the spectrum resource of each first cell among the N first cells in the first frequency band; or a second determining unit, configured to determine a spectrum resource of an $n^{th}$ first cell among the N first cells in the first frequency band and an $n^{th}$ second spectrum resource of the second cell, where the $n^{th}$ second spectrum resource is located in the first frequency band, the $n^{th}$ second spectrum resource does not overlap the spectrum resource of the $n^{th}$ first cell in the first frequency band in an overlapping coverage area of the second cell and the $n^{th}$ first cell, and a value of n is an integer ranging from 1 to N.

The spectrum resource determining apparatus may also be referred to as a communication apparatus.

In a possible implementation, the apparatus further includes a scheduling unit, configured to schedule data of a terminal on the $n^{th}$ second spectrum resource when the terminal is located in a coverage area of the $n^{th}$ first cell and interference of the terminal to each of the other first cells among the N first cells is less than or equal to a first threshold, where a serving cell of the terminal is the second cell.

In a possible implementation, the apparatus further includes a scheduling unit, configured to schedule data of a terminal on the first spectrum resource when the terminal is located in a coverage area of the $n^{th}$ first cell and interference of the terminal to any other first cell among the N first cells is greater than a first threshold, where a serving cell of the terminal is the second cell.

In a possible implementation, the obtaining unit is further configured to obtain spectrum resource requirement information, where the spectrum resource requirement information includes one or more of following information: spectrum resource requirement information of each first cell among the N first cells, spectrum resource requirement information of the second cell, and spectrum resource requirement information of the second cell in the overlapping coverage area of the second cell and the $n^{th}$ first cell; and the first determining unit is specifically configured to determine, based on the spectrum resource requirement information, the spectrum resource of each first cell among the N first cells in the first frequency band and the first spectrum resource of the second cell; or the second determining unit is specifically configured to determine, based on the spectrum resource requirement information, the spectrum resource of the $n^{th}$ first cell among the N first cells in the first frequency band and the $n^{th}$ second spectrum resource of the second cell.

In a possible implementation, the first frequency band is a frequency band used for uplink transmission or a frequency band used for downlink transmission.

In a possible implementation, the first frequency band is a frequency band used for uplink transmission, and a carrier including the first spectrum resource or the second spectrum resource in the second cell is used as a supplementary uplink SUL of the second cell, or the carrier including the first spectrum resource or the second spectrum resource in the second cell is used to perform uplink carrier aggregation CA with another carrier; or the first frequency band is a frequency band used for downlink transmission, and a carrier including the first spectrum resource or the second spectrum resource in the second cell is used to perform downlink CA with another carrier.

In a possible implementation, network standards of the first cell and the second cell are different.

In a possible implementation, the first cell is a long term evolution LTE cell, and the second cell is a new radio NR cell.

According to a third aspect, a spectrum resource determining apparatus is provided, and includes a processor. The processor is connected to a memory. The memory is configured to store computer-executable instructions, and the processor executes the computer-executable instructions stored in the memory, to implement the method provided in the first aspect. The memory and the processor may be integrated together, or may be independent components. If the memory and the processor are independent components, the memory may be located in the spectrum resource determining apparatus, or may be located outside the spectrum resource determining apparatus. The spectrum resource determining apparatus may also be referred to as a communication apparatus.

In a possible implementation, the spectrum resource determining apparatus exists in a product form of a chip.

According to a fourth aspect, a computer-readable storage medium including instructions is provided. When the instructions are run on a computer, the computer is enabled to perform the method provided in the first aspect.

According to a fifth aspect, a computer program product including instructions is provided. When the instructions are run on a computer, the computer is enabled to perform the method provided in the first aspect.

According to a sixth aspect, an embodiment of this application provides a chip. The chip includes a processor and an interface circuit, where the interface circuit is coupled to the processor. The processor is configured to run a computer program or instructions, to implement the method provided in the first aspect. The interface circuit is configured to communicate with another module outside the chip.

For technical effects brought by any implementation of the second aspect to the sixth aspect, refer to technical effects brought by a corresponding implementation of the first aspect. Details are not described herein again.

DESCRIPTION OF EMBODIMENTS

The following describes technical solutions in the embodiments of this application with reference to accompanying drawings in the embodiments of this application. In descriptions of this application, unless otherwise specified, "/" means "or". For example, A/B may represent A or B. "And/or" in this specification describes only an association relationship between associated objects, and represents that three relationships may exist. For example, A and/or B may represent the following three cases: Only A exists, both A and B exist, and only B exists. And in the descriptions of this application, unless otherwise specified, "a plurality of" means two or more than two. In addition, to clearly describe the technical solutions in the embodiments of this application, terms such as "first" and "second" are used in the embodiments of this application to distinguish between same items or similar items that provide basically same functions or purposes. A person skilled in the art may understand that the terms such as "first" and "second" do not limit a quantity and an execution sequence, and the terms such as "first" and "second" do not indicate a definite difference.

Figure 1:
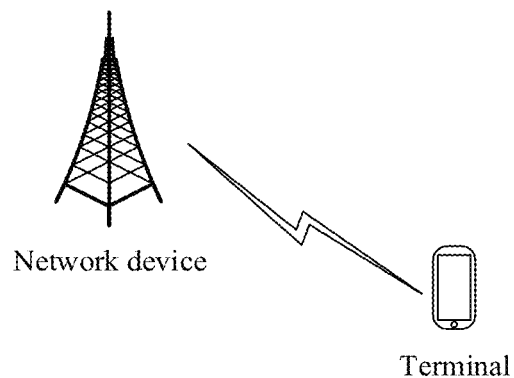
FIG. 1 is a schematic diagram of coverage of cells of different network standards.

The embodiments of this application provide a communication system. The communication system includes at least one network device and at least one terminal, and one or more terminals in the at least one terminal may communicate with one or more network devices in the at least one network device. One network device and one terminal are used as an example. Refer to FIG. 1. The network device and the terminal may perform wireless communication. It should be noted that the network device and the terminal included in the communication system shown in FIG. 1 are merely examples. In the embodiments of this application, types of network elements, a quantity of the network elements, and a connection relationship between the network elements included in the communication system, are not limited thereto.

The communication system in the embodiments of this application may be a communication system supporting a fourth generation (fourth generation, 4G) access technology, for example, a long term evolution (long term evolution, LTE) access technology, the communication system may be a communication system supporting a 5G access technology, for example, a new radio (new radio, NR) access technology, the communication system may be a communication system supporting a third generation (third generation, 3G) access technology, for example, a universal mobile telecommunications system (universal mobile telecommunications system, UMTS) access technology, or the communication system may be a communication system supporting a plurality of radio technologies, for example, a communication system supporting an LTE technology and an NR technology. In addition, the communication system is also applicable to a future-oriented communication technology.

The network device in the embodiments of this application may be a device that is on an access network side and that is configured to support a terminal in accessing a communication system, for example, a base transceiver station (base transceiver station, BTS) or a base station controller (base station controller, BSC) in a communication system supporting a second generation (second generation, 2G) access technology, a Node B (node B) and a radio network controller (radio network controller, RNC) in the communication system supporting the 3G access technology, an evolved NodeB (evolved nodeB, eNB) in the communication system supporting the 4G access technology, or a next generation NodeB (next generation nodeB, gNB), a transmission reception point (transmission reception point, TRP), a relay node (relay node), or an access point (access point, AP) in the communication system supporting the 5G access technology. The network device may be referred to as a base station, a node, or an access network device.

The terminal in the embodiments of this application may be a device that provides a user with voice or data connectivity, and the terminal may also be referred to as user equipment (user equipment, UE), a mobile station (mobile station), a subscriber unit (subscriber unit), a station (station), or terminal equipment (terminal equipment, TE). For example, the terminal may be a cellular phone (cellular phone), a personal digital assistant (personal digital assistant, PDA), a wireless modem (modem), a handheld (handheld) device, a laptop computer (laptop computer), a cordless phone (cordless phone), a wireless local loop (wireless local loop, WLL) station, or a pad (pad). With development of wireless communication technologies, any device that can access the communication system, any device that can communicate with a network side in the communication system, or any device that can communicate with another object by using the communication system may be the terminal in the embodiments of this application, for example, a terminal and a vehicle in intelligent transportation, a household device in a smart household, an electricity meter reading instrument or a voltage monitoring instrument in a smart grid, an environment monitoring instrument, a video surveillance instrument in an intelligent security network, or a cash register.

Spectrum sharing can be used to improve spectrum utilization for cells of different network standards. When spectrum sharing is performed between LTE cells and NR cells, refer to (a) in FIG. 2. If coverage areas of the LTE cells and the NR cells are in a one-to-one correspondence, some of spectrum resources of one LTE cell may be shared with a corresponding NR cell. This improves spectrum utilization. In some application scenarios, for example, to expand a capacity of an LTE cell, refer to (b) in FIG. 2. An original LTE cell may be split into two LTE cells. In this case, a quantity of LTE cells is greater than a quantity of NR cells in a same coverage area. In this case, to perform spectrum sharing, refer to (c) in FIG. 2. An original NR cell may be split into two NR cells, so that coverage areas of the LTE cells and the NR cells are in a one-to-one correspondence. In this case, some of spectrum resources of one LTE cell may be shared with a corresponding NR cell. Although utilization of spectrum resources is improved in this method, an NR baseband board needs to be added to support more NR cells, increasing cell deployment costs.

Figure 2:
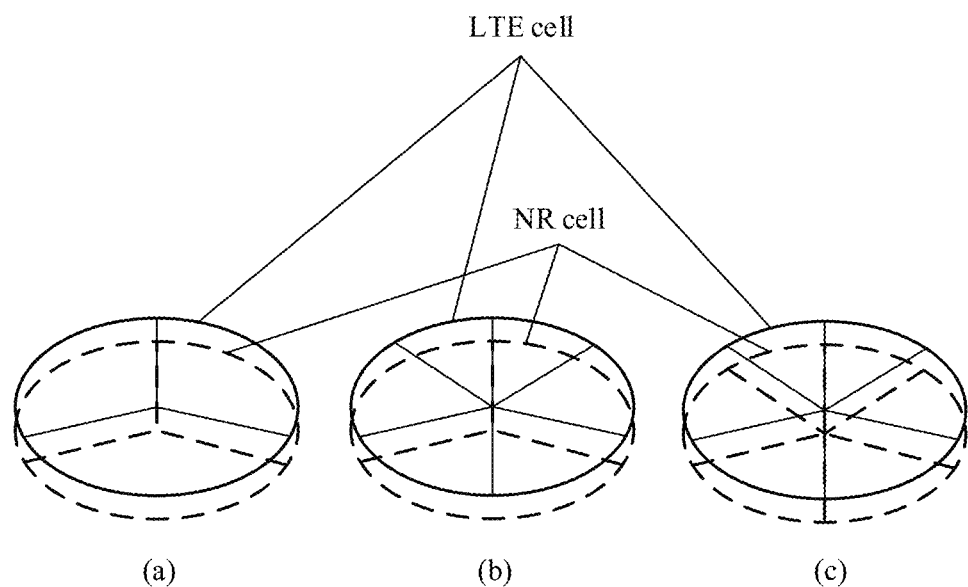
FIG. 2 and FIG. 3 each are a schematic diagram of a communication scenario.

In FIG. 2, one sector area represents one cell. A plurality of NR cells may be provided by one or more NR base stations, and a plurality of LTE cells may be provided by one or more LTE base stations.

This application provides a spectrum resource determining method. The method can implement spectrum sharing in a case in which quantities of cells of different network standards in a same coverage area are different, to increase spectrum utilization without increasing cell deployment costs.

For ease of understanding of the embodiments of this application, related terms used in this specification are first briefly described.
1. Time Division Duplex (Time Division Duplex, TDD)

TDD is a duplex communication technology in a communication system, and is used to separate a receiving channel and a sending channel, that is, an uplink and a downlink. In a communication system using a TDD mode, a same frequency domain resource is used for the uplink and the downlink, and the uplink and the downlink are distinguished by using different time domain resources.
2. Frequency Division Duplex (Frequency Division Duplex, FDD)

TDD is a duplex communication technology in a communication system, and is used to separate a receiving channel and a sending channel, that is, an uplink and a downlink. In a communication system using an FDD mode, a same time domain resource is used for the uplink and the downlink, and the uplink and the downlink are distinguished by using different frequency domain resources. For example, an uplink frequency range is different from a downlink frequency range.
3. Carrier Aggregation (Carrier Aggregation, CA)

CA is a technology for aggregating two or more component carriers (component carrier, CC) together to support a larger transmission bandwidth. CA can be classified into uplink CA and downlink CA. For the uplink CA, a terminal may simultaneously perform receiving or sending on one or more CCs based on a capability of the terminal. In the embodiments of this application, the component carrier is referred to as a carrier for short.
4. Supplementary Uplink (Supplementary Uplink, SUL)

Figure 3:
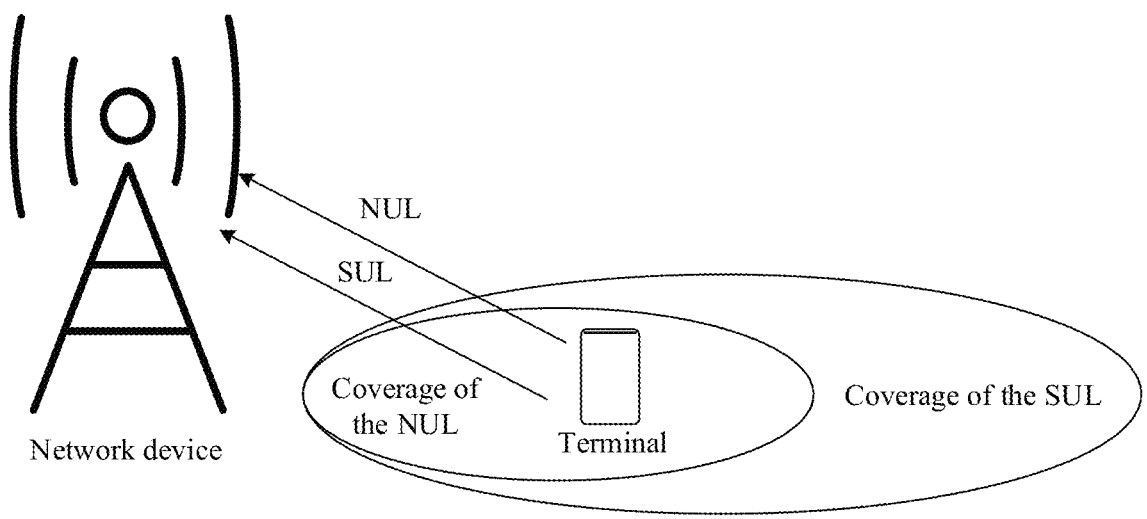

The SUL is configured for a terminal. The purpose is to improve uplink coverage of the terminal. Refer to FIG. 3. For example, the terminal may send uplink information through a normal uplink (normal uplink, NUL), or may send uplink information through the SUL. A coverage area of the NUL is smaller than a coverage area of the SUL. The coverage area of the SUL may be referred to as an SUL cell.

A network device can be used as an execution body of the embodiments of this application. The network device may be a base station that manages a first cell, may be a base station that manages a second cell, or may be an independent device other than the base station that manages the first cell and the base station that manages the second cell. Sharing information may be configured in the network device. For example, the sharing information may be configured by an operator. The sharing information may alternatively be input into the network device. For example, the sharing information may be input by a network management system.

Figure 4:
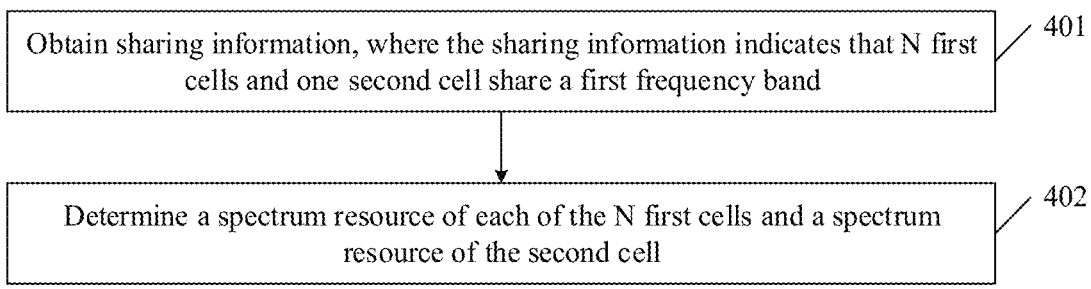
FIG. 4 is a flowchart of a spectrum resource determining method according to an embodiment of this application.

As shown is FIG. 4, an embodiment of this application provides a spectrum resource determining method, including the following steps.

401. Obtain sharing information, where the sharing information indicates that N first cells and one second cell share a first frequency band.

A coverage area of each first cell among the N first cells overlaps a coverage area of the second cell, and N is an integer greater than 1.

The N first cells may be N neighboring first cells. The N first cells may be managed by one base station, or may be managed by a plurality of base stations.

Optionally, network standards of the first cell and the second cell are different. For example, the first cells are LTE cells, and the second cell is an NR cell. In this case, a network device may be an LTE base station, an NR base station, or an independent device other than the LTE base station and the NR base station. Further, the second cell may be a normal cell or an SUL cell in the NR cell.

A plurality of first cells that overlap the coverage area of the second cell and the second cell may form a spectrum sharing group, and cells of different network standards in the spectrum sharing group may perform spectrum sharing. Further, the second cell and a plurality of first cells in a same coverage area may form a spectrum sharing group. Refer to (b) in FIG. 2. For example, one NR cell and two LTE cells in a same coverage area may form a spectrum sharing group.

During specific implementation, N beams (Beam) may be defined in the second cell. If a coverage area of one beam partially or completely overlaps a coverage area of one first cell, the beam and the first cell perform spectrum sharing.

The first frequency band may be any frequency band. For example, the first frequency band may be an entire 1.8G frequency band, a part of the 1.8G frequency band, an entire 3.5G frequency band, or a part of the 3.5G frequency band. The first frequency band is not specifically limited in the embodiments of this application.

402. Determine a spectrum resource of each of the N first cells and a spectrum resource of the second cell.

The spectrum resource of each of the N first cells and the spectrum resource of the second cell are all located in the first frequency band.

In a first optional implementation, the spectrum resource of the second cell may be referred to as a first spectrum resource, where the first spectrum resource does not overlap the spectrum resource of each first cell among the N first cells in the first frequency band.

In a second optional implementation, the spectrum resource of the second cell may include N second spectrum resources, each of which is an $n^{th}$ spectrum resource, and a value of n being an integer ranging from 1 to N.

In the second optional implementation, step 402 may be specifically implemented in the following manner: determining a spectrum resource of an $n^{th}$ first cell among the N first cells in the first frequency band; and determining an $n^{th}$ second spectrum resource of the second cell, where the $n^{th}$ second spectrum resource does not overlap the spectrum resource of the $n^{th}$ first cell in the first frequency band in an overlapping coverage area of the second cell and the $n^{th}$ first cell.

Spectrum resources of different first cells in the first frequency band may partially or completely overlap, or may not overlap at all. Any two second spectrum resources in the N second spectrum resources may partially or completely overlap, or may not overlap at all. The spectrum resources of the first cells and the spectrum resource of the second cell in the first frequency band may occupy the entire first frequency band, or may occupy a part of the first frequency band. In this embodiment of this application, an example in which the spectrum resources of the first cells and the spectrum resource of the second cell occupy the entire first frequency band is used to describe the method provided in this embodiment of this application.

For example, N=2, the first cells are LTE cells, and the second cell is an NR cell.

Figure 5:
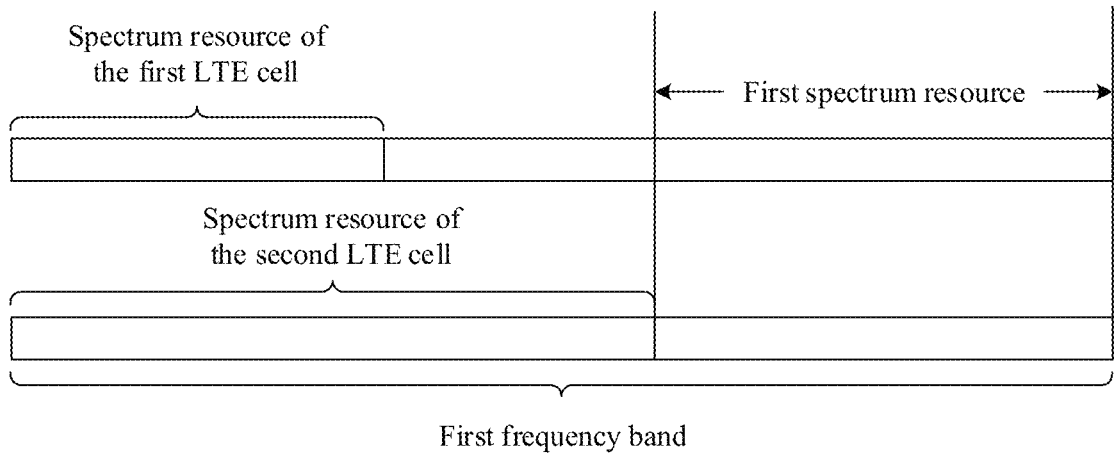
FIG. 5 to FIG. 10 each are a schematic diagram of distribution of spectrum resources in a first frequency band according to an embodiment of this application.

In the foregoing first implementation, for locations of the spectrum resource of each of the N LTE cells and the first spectrum resource of the NR cell, refer to FIG. 5.

Figure 6:
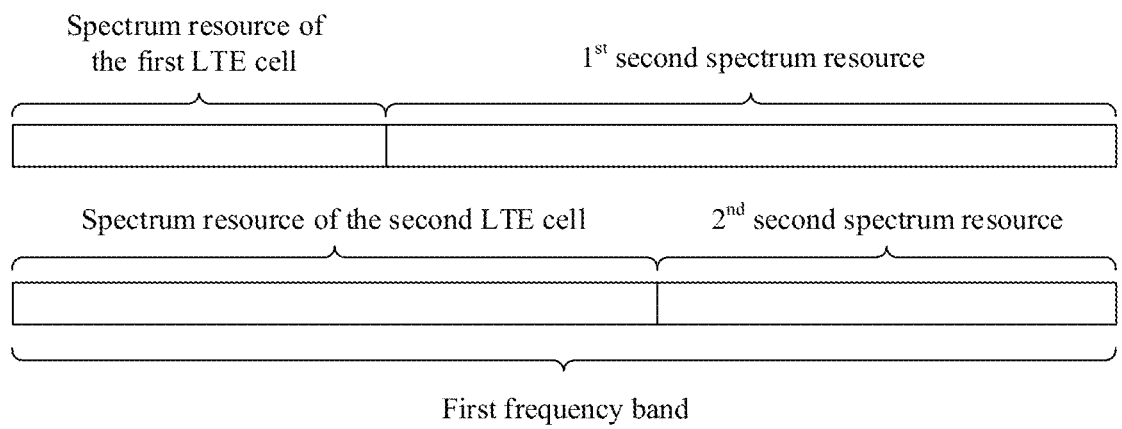

In the foregoing second implementation, for locations of the spectrum resource of each of the N LTE cells and the N second spectrum resources of the NR cell, refer to FIG. 6.

If the first cells are LTE cells, and the second cell is an NR cell, the method provided in this embodiment of this application can implement spectrum sharing between a plurality of LTE cells and one NR cell, to increase utilization of spectrum resources and a capacity of the NR cell. In addition, there is no need to newly establish a plurality of NR cells, which can avoid increasing cell deployment costs.

Before step 402, optionally, the method further includes: obtaining spectrum resource requirement information. In this case, during specific implementation, step 402 may include: determining, based on the spectrum resource requirement information, the spectrum resource of each first cell among the N first cells in the first frequency band and the first spectrum resource or the $n^{th}$ second spectrum resource of the second cell.

The spectrum resource requirement information includes one or more of the following information:
  information 1: spectrum resource requirement information of each first cell among the N first cells;
  information 2: spectrum resource requirement information of the second cell; and
  information 3: spectrum resource requirement information of the second cell in the overlapping coverage area of the second cell and the $n^{th}$ first cell.

Spectrum resource requirement information of a cell may be information about a quantity of resource blocks (resource block, RB) required by the cell, information about a quantity of subcarriers required by the cell, or the like.

During specific implementation of step 402, there may be different implementations based on different information included in the spectrum resource requirement information. The following separately gives a description with reference to a case 1 to a case 3.

Case 1: The spectrum resource requirement information includes at least the spectrum resource requirement information of each first cell among the N first cells.

In the case 1, during specific implementation of step 402, spectrum resources may be allocated to the N first cells in the first frequency band based on the spectrum resource requirement information of each cell among the N first cells. Then the first spectrum resource or the $n^{th}$ second spectrum resource in remaining spectrum resources in the first frequency band is allocated to the second cell.

Figure 7A:
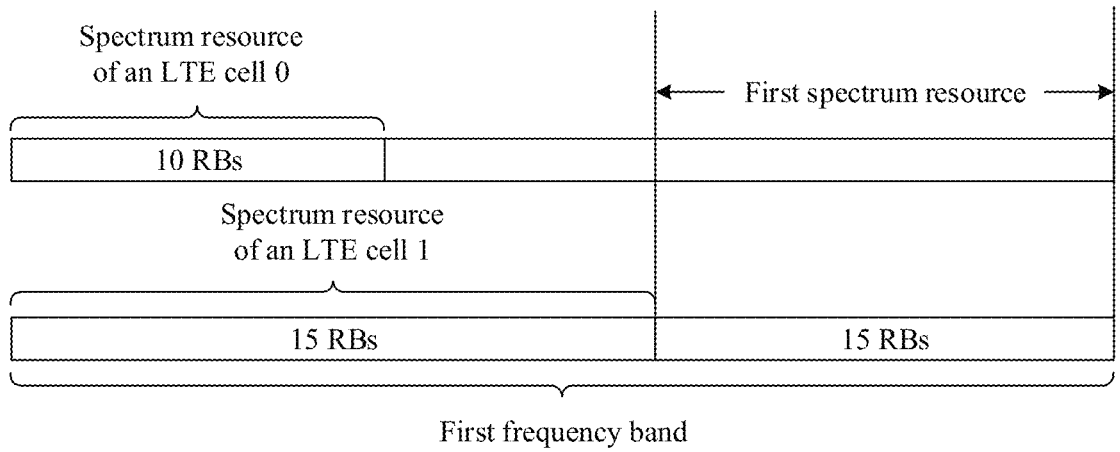
Figure 7B:
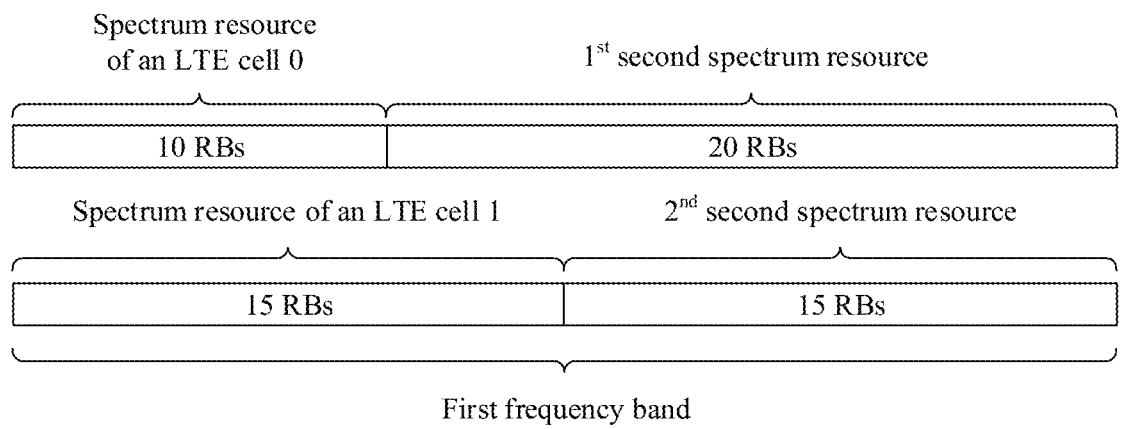

For example, the N first cells are an LTE cell 0 and an LTE cell 1, the second cell is an NR cell, a quantity of RBs required by the LTE cell 0 is 10, a quantity of RBs required by the LTE cell 1 is 15, and there are 30 RBs in total in the first frequency band. Refer to FIG. 7(*a*). In the first frequency band, 10 RBs may be allocated to the LTE cell 0, 15 RBs may be allocated to the LTE cell 1, and the 15 RBs allocated to the LTE cell 1 include the 10 RBs allocated to the LTE cell 0. In this case, 15 RBs in the first frequency band other than the 15 RBs allocated to the LTE cell 1 may be allocated to the second cell, where the 15 RBs are the first spectrum resource. Refer to FIG. 7(*b*). In the first frequency band, 10 RBs may be allocated to the LTE cell 0, 15 RBs may be allocated to the LTE cell 1, and the 15 RBs allocated to the LTE cell 1 include the 10 RBs allocated to the LTE cell 0. In this case, in an overlapping coverage area of the NR cell and the LTE cell 0, 20 RBs in the first frequency band other than the 10 RBs allocated to the LTE cell 0 are allocated to the second cell, where the 20 RBs are the $1^{st}$ second spectrum resource. In an overlapping coverage area of the NR cell and the LTE cell 1, 15 RBs in the first frequency band other than the 15 RBs allocated to the LTE cell 1 are allocated to the second cell, where the 15 RBs are the $2^{nd}$ second spectrum resource.

Case 2: The spectrum resource requirement information includes at least the spectrum resource requirement information of the second cell.

In the case 2, during specific implementation of step 402, the first spectrum resource may be allocated to the second cell in the first frequency band based on the spectrum resource requirement information of the second cell. Then each cell among the N first cells in remaining spectrum resources in the first frequency band is allocated to a terminal.

For example, the N first cells are an LTE cell 0 and an LTE cell 1, the second cell is an NR cell, a quantity of RBs required by the NR cell is 15, and there are 30 RBs in total in the first frequency band. Refer to FIG. 7(*a*). 15 RBs may be allocated to the second cell in the first frequency band, where the 15 RBs are the first spectrum resource. In this case, if a quantity of RBs required by the LTE cell 0 is 10, and a quantity of RBs required by the LTE cell 1 is 15, for 15 RBs other than the 15 RBs allocated to the second cell in the first frequency band, 10 RBs are allocated to the LTE cell 0, and 15 RBs are allocated to the LTE cell 1, where the 15 RBs allocated to the LTE cell 1 include the 10 RBs allocated to the LTE cell 0.

Case 3: The spectrum resource requirement information includes at least the spectrum resource requirement information of the second cell in the overlapping coverage area of the second cell and the $n^{th}$ first cell.

In the case 3, during specific implementation of step 402, the $n^{th}$ second spectrum resource may be allocated to the second cell in the first frequency band based on the spectrum resource requirement information of the second cell in the overlapping coverage area of the second cell and the $n^{th}$ first cell. Then each cell among the N first cells in remaining spectrum resources in the first frequency band is allocated to a terminal.

For example, the N first cells are an LTE cell 0 and an LTE cell 1, the second cell is an NR cell, a quantity of RBs required by a spectrum resource of the NR cell in an overlapping coverage area of the NR cell and the LTE cell 0 is 20, a quantity of RBs required by a spectrum resource of the NR cell in an overlapping coverage area of the NR cell and the LTE cell 1 is 15, and there are 30 RBs in total in the first frequency band. Refer to FIG. 7(*b*). 20 RBs are allocated to the NR cell in the overlapping coverage area of the NR cell and the LTE cell 0, where the 20 RBs are the $1^{st}$ second spectrum resource. 15 RBs are allocated to the NR cell in the overlapping coverage area of the NR cell and the LTE cell 1, where the 15 RBs are the $2^{nd}$ second spectrum resource. In this case, if a quantity of RBs required by the LTE cell 0 is 10, and a quantity of RBs required by the LTE cell 1 is 15, 10 RBs in the first frequency band other than the $1^{st}$ second spectrum resource are allocated to the LTE cell 0, and 15 RBs in the first frequency band other than the $2^{nd}$ second spectrum resource are allocated to the LTE cell 1.

After step 402, if the network device is an LTE base station, the method further includes: The LTE base station sends information about the first spectrum resource of the second cell or information about the N second spectrum resources of the second cell to an NR base station. If the network device is an NR base station, the method further includes: The NR base station sends information about the spectrum resource of each first cell among the N first cells to an LTE base station. The LTE base station and the NR base station may exchange information through an X2 interface.

If the network device is an independent device, the method further includes: sending information about the first spectrum resource of the second cell or information about the N second spectrum resources of the second cell to an NR base station; and sending information about the spectrum resource of each first cell among the N first cells to an LTE base station.

In a subsequent process, the LTE base station schedules data of the N first cells based on the spectrum resource of each first cell among the N first cells, and the NR base station schedules data of the second cell based on the first spectrum resource of the second cell or the N second spectrum resources of the second cell.

Based on the determined spectrum resources, the network device may schedule data of a terminal in the following two cases.

Case 1

Data of a terminal is scheduled on the $n^{th}$ second spectrum resource when the terminal is located in a coverage area of the $n^{th}$ first cell and interference of the terminal to each of the other first cells among the N first cells is less than or equal to a first threshold, where a serving cell of the terminal is the second cell.

Case 2

Data of a terminal is scheduled on the first spectrum resource when the terminal is located in a coverage area of the $n^{th}$ first cell and interference of the terminal to any other first cell among the N first cells is greater than a first threshold, where a serving cell of the terminal is the second cell.

The interference to a cell in the foregoing case 1 and case 2 may include interference to downlink reception of a terminal in the cell and/or interference to uplink reception of a base station that manages the cell. The first threshold may be preset or predefined, may be configured for the network device, or may be determined according to an actual application scenario. For example, the first threshold may be a threshold of reference signal received power (reference signal received power, RSRP) of a sounding reference signal (sounding reference signal, SRS) that is of the terminal and that is measured in a neighboring cell or a threshold of downlink RSRP that is in a neighboring cell and that is reported by the terminal.

For terminals whose serving cells are the second cell, when the terminals are located in a coverage area of one first cell and interference to each of the other first cells is less than or equal to the first threshold, the terminals may be referred to as first-type terminals. When the terminals are located in a coverage area of one first cell and interference to any other first cell is greater than the first threshold, the terminals may be referred to as second-type terminals.

Optionally, the method further includes: The NR base station determines whether each terminal whose serving cell is the second cell is a first-type terminal or a second-type terminal. If all terminals whose serving cells are the second cell are second-type terminals, when allocating resources to the second-type terminals, the NR base station allocates resources in the first spectrum resource. One resource in the first spectrum resource is allocated to only one second-type terminal, to avoid interference between the second-type terminals. If a terminal whose serving cell is the second cell is a first-type terminal, and if the terminal is located in the overlapping coverage area of the second cell and the $n^{th}$ first cell, the NR base station may allocate a resource in an $n^{th}$ second spectrum resource to the terminal. Because the terminal does not interfere with another terminal, a terminal located in a coverage area of another first cell may normally use the resource in the $n^{th}$ second spectrum resource. There is no mutual influence.

During specific implementation of the method, optionally, the NR base station may determine, based on uplink signal received quality and/or downlink signal received quality, whether each terminal in the second cell is a first-type terminal or a second-type terminal. The uplink signal received quality may be RSRP, measured by using each receive port of an uplink receive antenna of the NR base station, of a signal (for example, an SRS) sent by the terminal, and the downlink signal received quality may be RSRP, measured by the terminal, of a signal sent by the NR base station.

For example, if the N first cells are an LTE cell 0 and an LTE cell 1, the NR base station may measure an SRS sent by the terminal by using four antenna ports. Receive beams used by the first antenna port and the second antenna port of the four antenna ports face the LTE cell 0, and receive beams used by the third antenna port and the fourth antenna port face the LTE cell 1. If RSRP obtained by measuring the SRS by using the first antenna port and the second antenna port is similar to RSRP obtained by measuring the SRS by using the third antenna port and the fourth antenna port, it indicates that the terminal is a second-type terminal. If the RSRP obtained by measuring the SRS by using the first antenna port and the second antenna port is far different from the RSRP obtained by measuring the SRS by using the third antenna port and the fourth antenna port, it indicates that the terminal is a first-type terminal.

In the foregoing embodiment, the first frequency band may be a frequency band used for uplink transmission, may be a frequency band used for downlink transmission, or may include both a frequency band used for uplink transmission and a frequency band used for downlink transmission.

Optionally, if the first frequency band is a frequency band used for uplink transmission, in one case, a carrier including the first spectrum resource or the second spectrum resource in the second cell is used as an SUL of the second cell. In another case, the carrier including the first spectrum resource and the second spectrum resource in the second cell is used to perform uplink CA with another carrier. If the first frequency band is a frequency band used for downlink transmission, a carrier including the first spectrum resource and the second spectrum resource in the second cell is used to perform downlink CA with another carrier.

Figure 8:
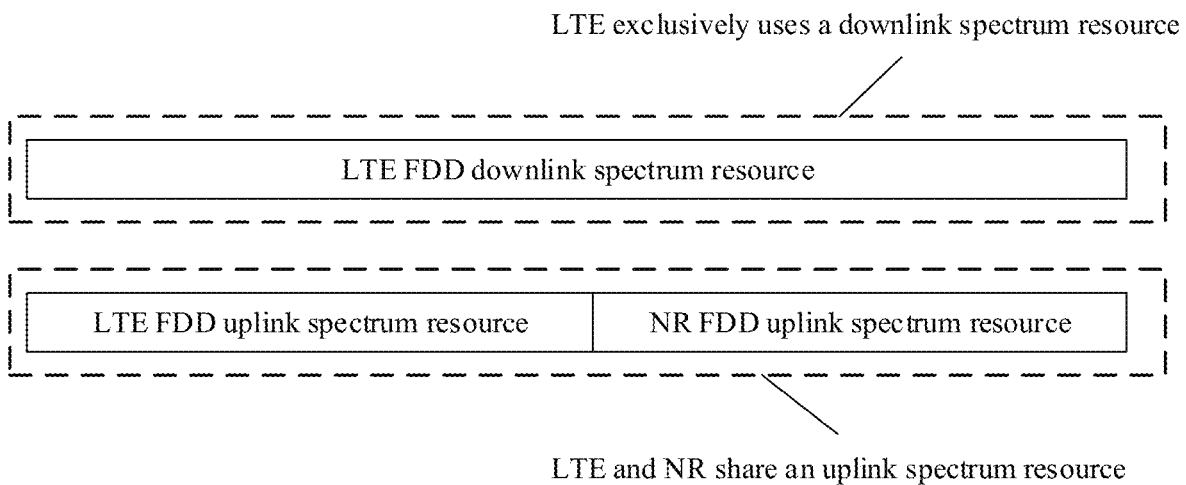
Figure 9:
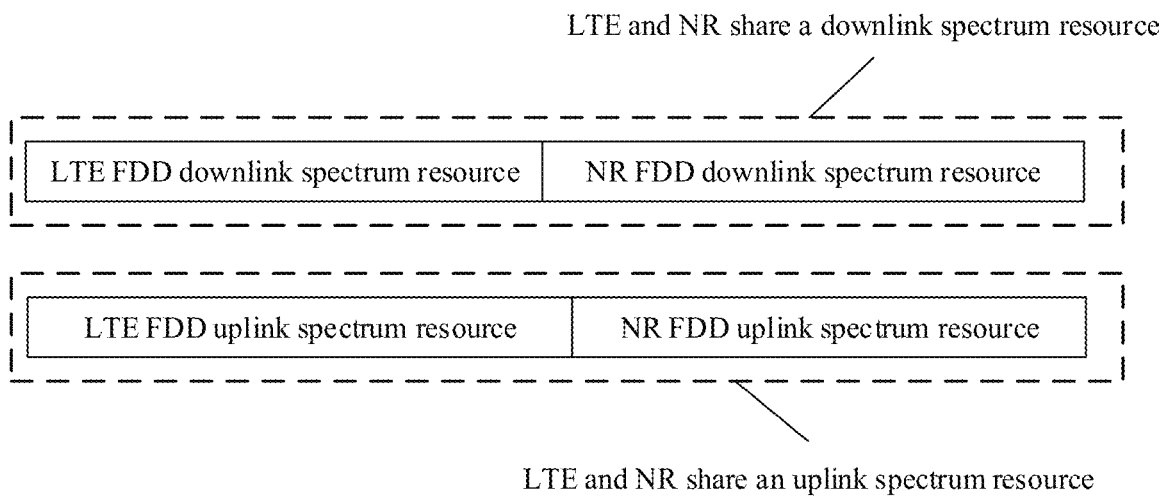
Figure 10:
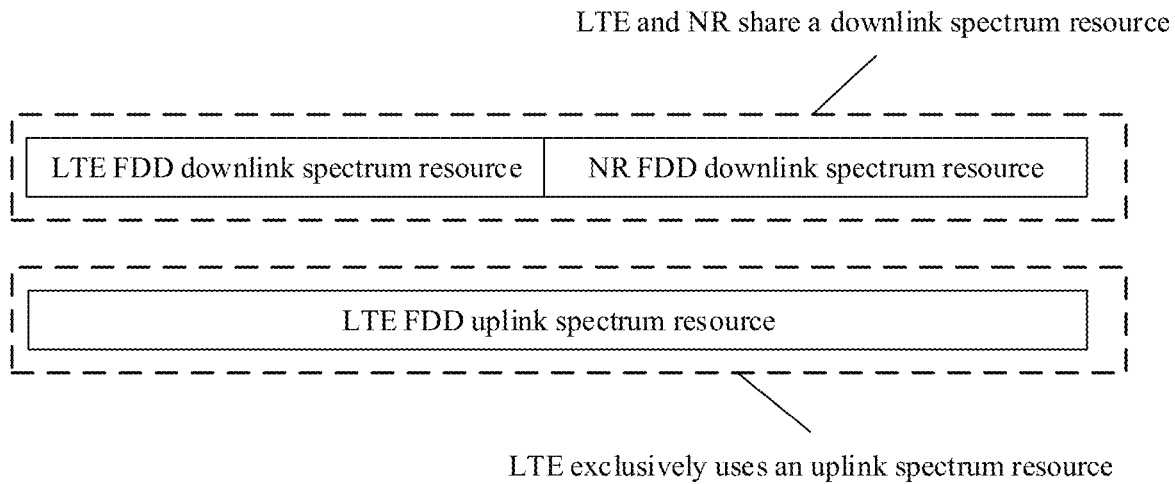

The first frequency band may be an FDD frequency band, or may be a TDD frequency band. During specific implementation, the LTE cell and the NR cell may share an uplink spectrum resource and/or a downlink spectrum resource, to provide an NR FDD spectrum resource for a 5G network, enable the 5G network to support downlink CA, or enable the 5G network to support uplink CA. That the first frequency band is an FDD frequency band is used as an example. The method provided in this embodiment of this application may be applied to a plurality of scenarios. For example, when an operator does not have an exclusive NR FDD spectrum resource, refer to FIG. 8. An LTE cell and an NR cell may share an uplink spectrum resource, and provide an NR FDD uplink spectrum resource for a 5G network, thereby supporting an SUL and improving uplink coverage of the NR cell. For example, when an operator does not have an exclusive NR FDD spectrum resource, refer to FIG. 9. An LTE cell and an NR cell may share an uplink spectrum resource and a downlink spectrum resource, and provide an NR FDD uplink spectrum resource and an NR FDD downlink spectrum resource for a 5G network, thereby supporting NR in FDD mode. For example, refer to FIG. 10. An LTE cell and an NR cell share a downlink spectrum resource, and provide an NR FDD downlink spectrum resource for a 5G network, thereby supporting downlink CA of the NR cell.

The frequency band in this embodiment of this application may also be referred to as a frequency band.

The foregoing mainly describes the solutions in the embodiments of this application from a perspective of the method. It may be understood that, to implement the foregoing functions, a spectrum resource determining apparatus includes at least one of a corresponding hardware structure and a corresponding software module for performing each function. A person skilled in the art should be easily aware that, in combination with the examples of units and algorithm steps described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, division into function units may be performed on a spectrum resource determining apparatus based on the foregoing example of the method. For example, function units may be obtained through division based on corresponding functions, or two or more than two functions may be integrated into one processing unit. The integrated unit may be implemented in a form of hardware, or may be implemented in a form of a software function unit. It should be noted that in the embodiments of this application, division into units is an example, and is merely logical function division. During actual implementation, there may be another division manner.

Figure 11:
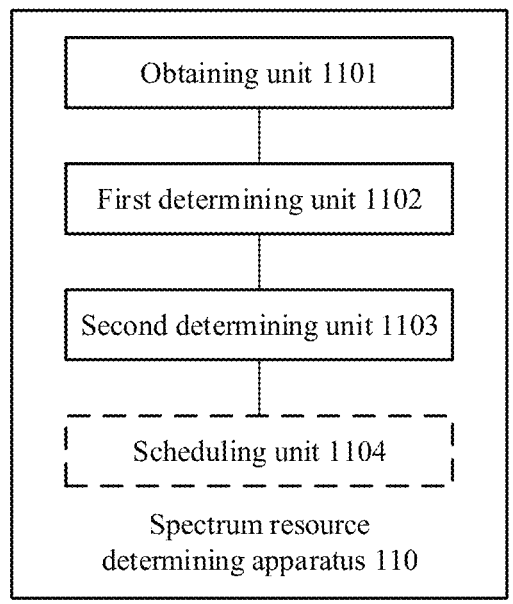
FIG. 11 is a schematic diagram of composition of a spectrum resource determining apparatus according to an embodiment of this application.

When units are obtained through division based on each function, FIG. 11 is a possible schematic diagram of a structure of the spectrum resource determining apparatus (denoted as a spectrum resource determining apparatus 110) in the foregoing embodiment. As shown in FIG. 11, the spectrum resource determining apparatus 110 includes:
- an obtaining unit 1101, configured to obtain sharing information, where the sharing information indicates that N first cells and one second cell share a first frequency band, a coverage area of each first cell among the N first cells overlaps a coverage area of the second cell, and N is an integer greater than 1; and
- a first determining unit 1102, configured to determine a spectrum resource of each first cell among the N first cells in the first frequency band and a first spectrum resource of the second cell, where the first spectrum resource is located in the first frequency band, and the first spectrum resource does not overlap the spectrum resource of each first cell among the N first cells in the first frequency band; or
- a second determining unit 1103, configured to determine a spectrum resource of an $n^{th}$ first cell among the N first cells in the first frequency band and an $n^{th}$ second spectrum resource of the second cell, where the $n^{th}$ second spectrum resource is located in the first frequency band, the $n^{th}$ second spectrum resource does not overlap the spectrum resource of the $n^{th}$ first cell in the first frequency band in an overlapping coverage area of the second cell and the $n^{th}$ first cell, and a value of n is an integer ranging from 1 to N.

Optionally, refer to FIG. 11. The apparatus further includes a scheduling unit 1104, configured to schedule data of a terminal on the $n^{th}$ second spectrum resource when the terminal is located in a coverage area of the $n^{th}$ first cell and interference of the terminal to each of the other first cells among the N first cells is less than or equal to a first threshold, where a serving cell of the terminal is the second cell.

Optionally, refer to FIG. 11. The apparatus further includes a scheduling unit 1104, configured to schedule data of a terminal on the first spectrum resource when the terminal is located in a coverage area of the $n^{th}$ first cell and interference of the terminal to any other first cell among the N first cells is greater than a first threshold, where a serving cell of the terminal is the second cell.

Optionally, the obtaining unit 1101 is further configured to obtain spectrum resource requirement information, where the spectrum resource requirement information includes one or more of following information: spectrum resource requirement information of each first cell among the N first cells, spectrum resource requirement information of the second cell, and spectrum resource requirement information of the second cell in the overlapping coverage area of the second cell and the $n^{th}$ first cell.

The first determining unit 1102 is specifically configured to determine, based on the spectrum resource requirement information, the spectrum resource of each first cell among the N first cells in the first frequency band and the first spectrum resource of the second cell; or
- the second determining unit 1103 is specifically configured to determine, based on the spectrum resource requirement information, the spectrum resource of the $n^{th}$ first cell among the N first cells in the first frequency band and the $n^{th}$ second spectrum resource of the second cell.

Optionally, the first frequency band is a frequency band used for uplink transmission or a frequency band used for downlink transmission.

Optionally, the first frequency band is a frequency band used for uplink transmission, and a carrier including the first spectrum resource or the second spectrum resource in the second cell is used as an SUL of the second cell, or the carrier including the first spectrum resource or the second spectrum resource in the second cell is used to perform uplink CA with another carrier; or the first frequency band is a frequency band used for downlink transmission, and a carrier including the first spectrum resource or the second spectrum resource in the second cell is used to perform downlink CA with another carrier.

Optionally, network standards of the first cell and the second cell are different.

Optionally, the first cells are LTE cells, and the second cell is an NR cell.

When an integrated unit is used, actions of the foregoing units may be executed by a processing unit. The units in FIG. 11 may also be referred to as modules.

The spectrum resource determining apparatus 110 may be a device, or may be a chip in the device.

When each unit in FIG. 11 is implemented in a form of a software function module and sold or used as an independent product, the unit may be stored in a computer-readable storage medium. Based on such an understanding, the technical solutions of the embodiments of this application essentially, or the part contributing to the conventional technology, or all or some of the technical solutions may be implemented in a form of a software product. The computer software product is stored in a storage medium, and includes several instructions for instructing a computer device (which may be a personal computer, a server, or a network device) or a processor (processor) to perform all or some of the steps of the methods described in the embodiments of this application. The storage medium that stores the computer software product includes any medium that can store program code, such as a USB flash drive, a removable hard disk, a read-only memory (read-only memory, ROM), a random access memory (random access memory, RAM), a magnetic disk, or an optical disc.

Figure 12:
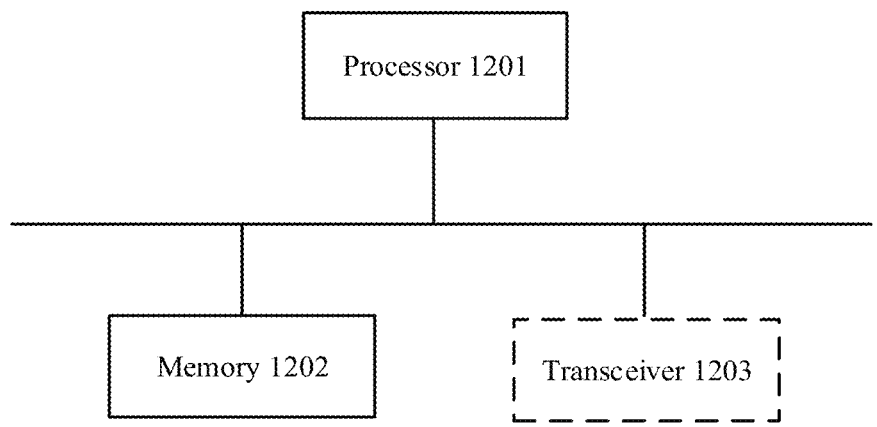
FIG. 12 and FIG. 13 each are a schematic diagram of a hardware structure of a spectrum resource determining apparatus according to an embodiment of this application.
Figure 13:
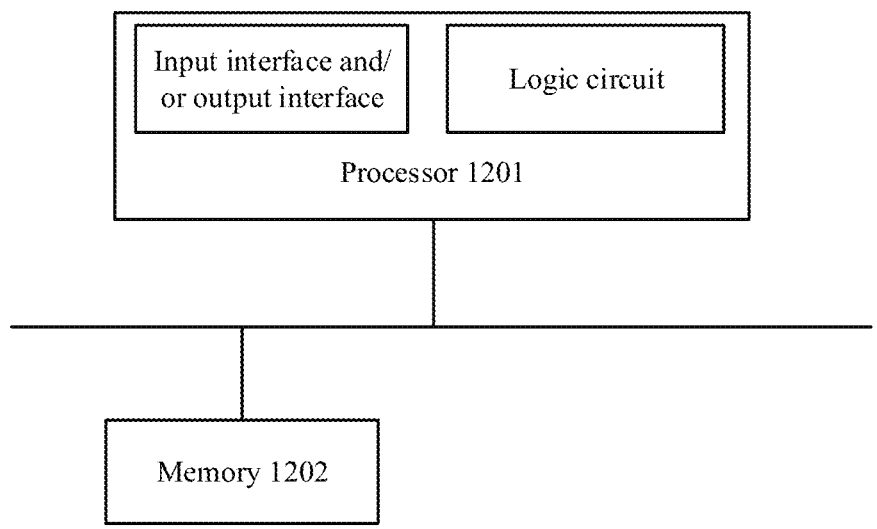

An embodiment of this application further provides a schematic diagram of a hardware structure of a spectrum resource determining apparatus. Refer to FIG. 12 or FIG. 13. The spectrum resource determining apparatus includes a processor 1201, and optionally, further includes a memory 1202 connected to the processor 1201.

The processor 1201 may be a general-purpose central processing unit (central processing unit, CPU), a microprocessor, an application-specific integrated circuit (application-specific integrated circuit, ASIC), or one or more integrated circuits configured to control program execution of the solutions in this application. The processor 1201 may further include a plurality of CPUs, and the processor 1201 may be a single-core (single-CPU) processor or a multi-core (multi-CPU) processor. The processor herein may be one or more devices, circuits, or processing cores configured to process data (for example, computer program instructions).

The memory 1202 may be a ROM or another type of static storage device that can store static information and instructions, a RAM or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compressed optical disc, a laser disc, an optical disc, a digital versatile disc, a Blu-ray disc), a magnetic disk storage medium or another magnetic storage device, or any other medium that can be used to carry or store expected program code in a form of instructions or a data structure and that can be accessed by a computer. This is not limited in the embodiments of this application. The memory 1202 may exist independently, or may be integrated into the processor 1201. The memory 1202 may include computer program code. The processor 1201 is configured to execute the computer program code stored in the memory 1202, to implement the method provided in the embodiments of this application.

In a first possible implementation, refer to FIG. 12. The spectrum resource determining apparatus further includes a transceiver 1203. The processor 1201, the memory 1202, and the transceiver 1203 are connected by using a bus. The transceiver 1203 is configured to communicate with another device or a communication network. Optionally, the transceiver 1203 may include a transmitter and a receiver. A component configured to implement a receiving function in the transceiver 1203 may be considered as a receiver. The receiver is configured to perform a receiving step in the embodiments of this application. A component configured to implement a sending function in the transceiver 1203 may be considered as a transmitter. The transmitter is configured to perform a sending step in the embodiments of this application. In this case, the processor 1201 is configured to control and manage an action of the spectrum resource determining apparatus. For example, the processor 1201 is configured to support the spectrum resource determining apparatus in performing the steps in FIG. 4, and/or an action performed by the spectrum resource determining apparatus in another process described in the embodiments of this application. The processor 1201 may communicate with another network entity by using the transceiver 1203. For example, when the spectrum resource determining apparatus is an NR base station, the NR base station may send spectrum resources of N first cells to an LTE base station by using the transceiver 1203. The memory 1202 is configured to store program code and data of the spectrum resource determining apparatus.

In a second possible implementation, the processor 1201 includes a logic circuit and at least one of an input interface and an output interface. The output interface is configured to perform a sending action in a corresponding method, and the input interface is configured to perform a receiving action in the corresponding method. In this case, the processor 1201 is configured to support the spectrum resource determining apparatus in performing the steps in FIG. 4, and/or an action performed by the spectrum resource determining apparatus in another process described in the embodiments of this application. The processor 1201 may communicate with another network entity by using at least one of the input interface and the output interface. For example, when the spectrum resource determining apparatus is an NR base station, the NR base station may send spectrum resources of N first cells to an LTE base station by using the output interface. The memory 1202 is configured to store program code and data of the spectrum resource determining apparatus.

FIG. 12 and FIG. 13 may further illustrate a system chip in the spectrum resource determining apparatus. In this case, an action performed by the spectrum resource determining apparatus may be implemented by the system chip. For a specific action performed, refer to the foregoing descriptions. Details are not described herein again.

In addition, an embodiment of this application further provides a schematic diagram of a hardware structure of a network device (denoted as a network device 140). For details, refer to FIG. 14. The network device may be the NR base station in the foregoing embodiments, and the NR base station may perform the method provided in the foregoing embodiments.

Figure 14:
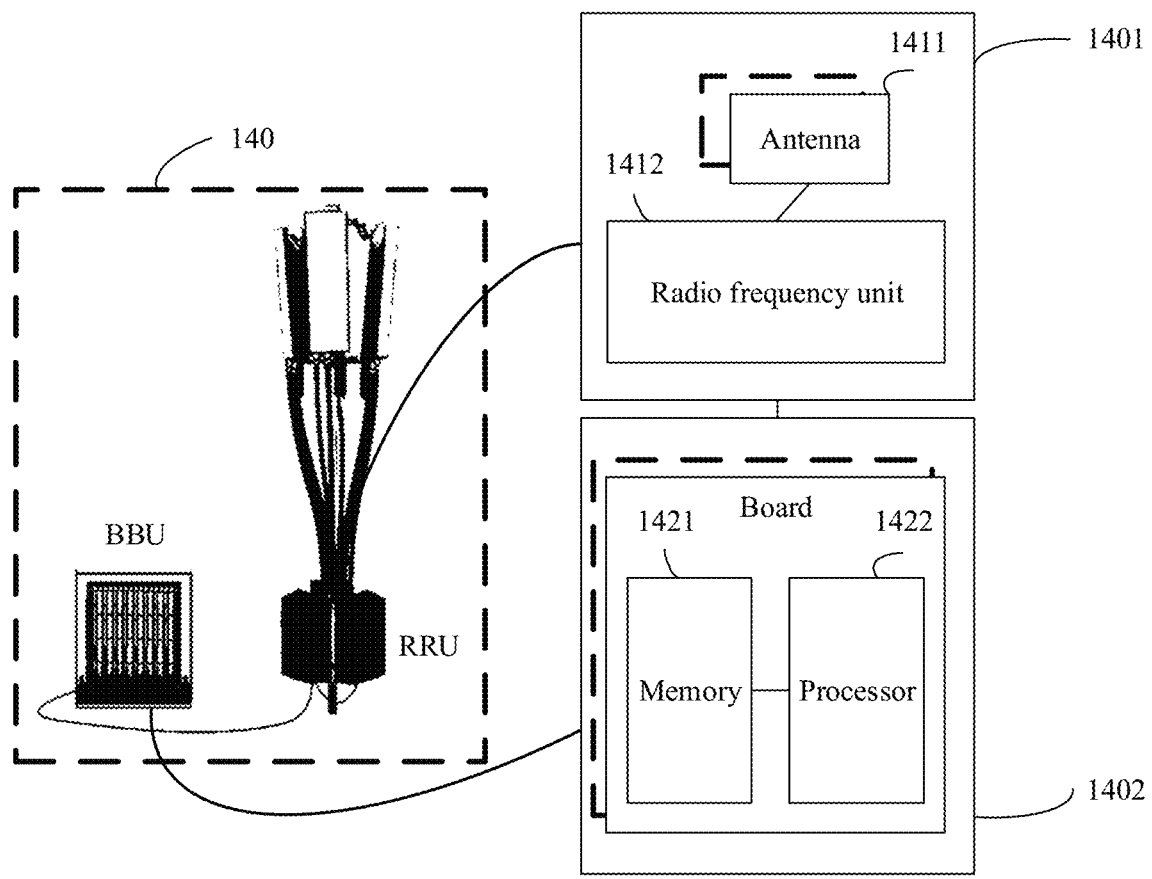
FIG. 14 is a schematic diagram of a hardware structure of a network device according to an embodiment of this application.

FIG. 14 is a schematic diagram of the hardware structure of the network device 140. The network device 140 may include one or more radio frequency units, such as a remote radio unit (remote radio unit, RRU) 1401, and one or more baseband units (baseband unit, BBU) (which may also be referred to as digital units (digital unit, DU)) 1402.

The RRU 1401 may be referred to as a transceiver unit, a transceiver machine, a transceiver circuit, or a transceiver, and may include at least one antenna 1411 and a radio frequency unit 1412. The RRU 1401 is mainly configured to: send and receive a radio frequency signal, and convert between a radio frequency signal and a baseband signal. The RRU 1401 and the BBU 1402 may be physically disposed together, or may be physically disposed separately, for example, a distributed base station.

The BBU 1402 is a control center of the network device, or may be referred to as a processing unit, and is mainly configured to complete baseband processing functions such as channel coding, multiplexing, modulation, and spread spectrum.

In an embodiment, the BBU 1402 may include one or more boards. A plurality of boards may jointly support a radio access network (such as an LTE network) of a single access standard, or may separately support radio access networks (such as an LTE network, a 5G network, or another network) of different access standards. The BBU 1402 further includes a memory 1421 and a processor 1422. The memory 1421 is configured to store necessary instructions and data. The processor 1422 is configured to control the network device to perform a necessary action. The memory 1421 and the processor 1422 may serve one or more boards. In other words, a memory and a processor may be separately disposed on each board. Alternatively, the plurality of boards may share a same memory and a same processor. In addition, a necessary circuit may be further disposed on each board.

It should be understood that the network device 140 shown in FIG. 14 can perform the steps in FIG. 4, and/or an action performed by the network device in another process described in the embodiments of this application. Operations, functions, or operations and functions of modules in the network device 140 are separately set to implement corresponding procedures performed in the foregoing method embodiment. For details, refer to the descriptions in the foregoing method embodiment. To avoid repetition, detailed descriptions are properly omitted herein.

In an implementation process, the steps of the method in the embodiments can be completed by using a hardware integrated logical circuit in the processor, or by using instructions in a form of software. The steps of the method disclosed with reference to the embodiments of this application may be directly performed by a hardware processor, or may be performed by using a combination of hardware in the processor and a software module. For other descriptions about the processor in FIG. 14, refer to descriptions related to the processor in FIG. 12 and FIG. 13. Details are not described again.

An embodiment of this application further provides a chip. The chip includes a processor and an interface circuit, where the interface circuit is coupled to the processor. The processor is configured to run a computer program or instructions, to implement the foregoing method. The interface circuit is configured to communicate with another module outside the chip.

An embodiment of this application further provides a computer-readable storage medium, including instructions. When the instructions are run on a computer, the computer is enabled to perform any one of the foregoing methods.

An embodiment of this application further provides a computer program product, including instructions. When the instructions are run on a computer, the computer is enabled to perform any one of the foregoing methods.

An embodiment of this application further provides a communication system, including the foregoing spectrum resource determining apparatus.

The spectrum resource determining apparatus may also be referred to as a communication apparatus.

The processor in this application may include but is not limited to at least one of the following computing devices that run software: a central processing unit (central processing unit, CPU), a microprocessor, a digital signal processor (DSP), a microcontroller unit (microcontroller unit, MCU), an artificial intelligence processor, or the like. Each computing device may include one or more cores configured to perform an operation or processing by executing a software instruction. The processor may be an independent semiconductor chip, or may be integrated with another circuit to form a semiconductor chip. For example, the processor and another circuit (for example, an encoding/decoding circuit, a hardware acceleration circuit, or various buses and interface circuits) may form a SoC (system-on-a-chip). Alternatively, the processor may be integrated into an ASIC as a built-in processor of the ASIC, and the ASIC integrated with the processor may be independently packaged or may be packaged with another circuit. In addition to the core configured to perform an operation or processing by executing a software instruction, the processor may further include a necessary hardware accelerator, for example, a field programmable gate array (field programmable gate array, FPGA), a PLD (programmable logic device), or a logic circuit that implements a dedicated logic operation.

The memory in the embodiments of this application may include at least one of the following types: a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (Electrically erasable programmable read-only memory, EEPROM). In some scenarios, the memory may alternatively be a compact disc read-only memory (compact disc read-only memory, CD-ROM) or another compact disc storage, an optical disc storage (including a compressed optical disc, a laser disc, an optical disc, a digital versatile disc, a Blu-ray disc), a magnetic disk storage medium or another magnetic storage device, or any other medium that can be used to carry or store expected program code in a form of instructions or a data structure and that can be accessed by a computer. This is not limited thereto.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on the computer, all or some of the procedures or functions are generated according to the embodiments of this application. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium that can be accessed by a computer, or may be a data storage device, such as a server or a data center that can be integrated by one or more mediums. The usable medium may be a magnetic medium (for example, a floppy disk, a hard disk, or a magnetic tape), an optical medium (for example, a DVD), a semiconductor medium (for example, a solid state drive (solid state drive, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a case of "a plurality of". A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to them without departing from the spirit and scope of this application. Correspondingly, the specification and accompanying drawings are merely example description of this application defined by the appended claims, and is considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of the claims of this application and equivalent technologies thereof.

What is claimed is:

1. A spectrum resource determining method, comprising:
   obtaining sharing information, wherein the sharing information indicates that N first cells and one second cell share a first frequency band, a coverage area of each first cell among the N first cells overlaps a coverage area of the second cell, and N is an integer greater than 1;
   obtaining spectrum resource requirement information, wherein the spectrum resource requirement information comprises one or more of a quantity of resource blocks required by each first cell among the N first cells, a quantity of resource blocks required by the second cell, or a quantity of resource blocks required by the second cell in the overlapping coverage area of the second cell and an $n^{th}$ first cell among the N first cells; and
   determining, based on the spectrum resource requirement information, a spectrum resource of each first cell among the N first cells in the first frequency band and a first spectrum resource of the second cell, wherein the first spectrum resource is located in the first frequency band, and the first spectrum resource does not overlap the spectrum resource of each first cell among the N first cells in the first frequency band.

2. The method according to claim 1, wherein the first frequency band is used for uplink transmission.

3. The method according to claim 2, wherein a carrier comprising the first spectrum resource in the second cell is used as a supplementary uplink (SUL) of the second cell, or the carrier comprising the first spectrum resource in the second cell is used to perform uplink carrier aggregation (CA) with another carrier.

4. The method according to claim 1, wherein network standards of the first cell and the second cell are different.

5. The method according to claim 4, wherein the first cell is a long term evolution (LTE) cell, and the second cell is a new radio (NR) cell.

6. The method according to claim 1, wherein the first frequency band is used for downlink transmission.

7. The method according to claim 6, wherein a carrier comprising the first spectrum resource in the second cell is used to perform downlink carrier aggregation (CA) with another carrier.

8. The method according to claim 1, wherein resource blocks included in the first spectrum resource of each first cell among the N first cells in the first frequency band are other than resource blocks allocated to the second cell.

9. A network device, comprising:
   a processor; and
   a non-transitory storage medium coupled to the processor and storing executable instructions that, when executed by the processor, cause the network device to:
   obtain sharing information, wherein the sharing information indicates that N first cells and one second cell share a first frequency band, a coverage area of each first cell among the N first cells overlaps a coverage area of the second cell, and N is an integer greater than 1;
   obtain spectrum resource requirement information, wherein the spectrum resource requirement information comprises one or more of a quantity of resource blocks required by each first cell among the N first cells, a quantity of resource blocks required by the second cell, or a quantity of resource blocks required by the second cell in the overlapping coverage area of the second cell and an $n^{th}$ first cell among the N first cells; and
   determine, based on the spectrum resource requirement information, a spectrum resource of each first cell among the N first cells in the first frequency band and a first spectrum resource of the second cell, wherein the first spectrum resource is located in the first frequency band, and the first spectrum resource does not overlap the spectrum resource of each first cell among the N first cells in the first frequency band.

10. The network device according to claim 9, wherein the first frequency band is used for uplink transmission.

11. The network device according to claim 10, wherein a carrier comprising the first spectrum resource in the second cell is used as a supplementary uplink (SUL) of the second cell, or the carrier comprising the first spectrum resource in the second cell is used to perform uplink carrier aggregation (CA) with another carrier.

12. The network device according to claim 9, wherein network standards of the first cell and the second cell are different.

13. The network device according to claim 12, wherein the first cell is a long term evolution (LTE) cell, and the second cell is a new radio (NR) cell.

14. The network device according to claim 9, wherein the first frequency band is used for downlink transmission.

15. The network device according to claim 14, wherein a carrier comprising the first spectrum resource in the second cell is used to perform downlink carrier aggregation (CA) with another carrier.

16. The network device according to claim 9, wherein resource blocks included in the first spectrum resource of each first cell among the N first cells in the first frequency band are other than resource blocks allocated to the second cell.

17. A spectrum resource determining method, comprising:

obtaining sharing information, wherein the sharing information indicates that N first cells and one second cell share a first frequency band, a coverage area of each first cell among the N first cells overlaps a coverage area of the second cell, and N is an integer greater than 1;

obtaining spectrum resource requirement information, wherein the spectrum resource requirement information comprises one or more of a quantity of resource blocks required by each first cell among the N first cells, a quantity of resource blocks required by the second cell, or a quantity of resource blocks required by the second cell in the overlapping coverage area of the second cell and an $n^{th}$ first cell among the N first cells; and determining, based on the spectrum resource requirement information, a spectrum resource of an $n^{th}$ first cell among the N first cells in the first frequency band and an $n^{th}$ second spectrum resource of the second cell, wherein the $n^{th}$ second spectrum resource is located in the first frequency band, the $n^{th}$ second spectrum resource does not overlap the spectrum resource of the $n^{th}$ first cell in the first frequency band in an overlapping coverage area of the second cell and the $n^{th}$ first cell, and a value of n is an integer ranging from 1 to N.

18. The method according to claim 17, wherein the method further comprises:

scheduling data of a terminal on the $n^{th}$ second spectrum resource when the terminal is located in a coverage area of the $n^{th}$ first cell, and when interference of the terminal to each of the other first cells among the N first cells is less than or equal to a first threshold, wherein a serving cell of the terminal is the second cell.

19. The method according to claim 17, wherein the method further comprises:

scheduling data of a terminal on the spectrum resource when the terminal is located in a coverage area of the $n^{th}$ first cell, and when interference of the terminal to any other first cell among the N first cells is greater than a first threshold, wherein a serving cell of the terminal is the second cell.

20. The method according to claim 17, wherein resource blocks included in the first spectrum resource of each first cell among the N first cells in the first frequency band are other than resource blocks allocated to the second cell.

\* \* \* \* \*